UNITED STATES PATENT OFFICE.

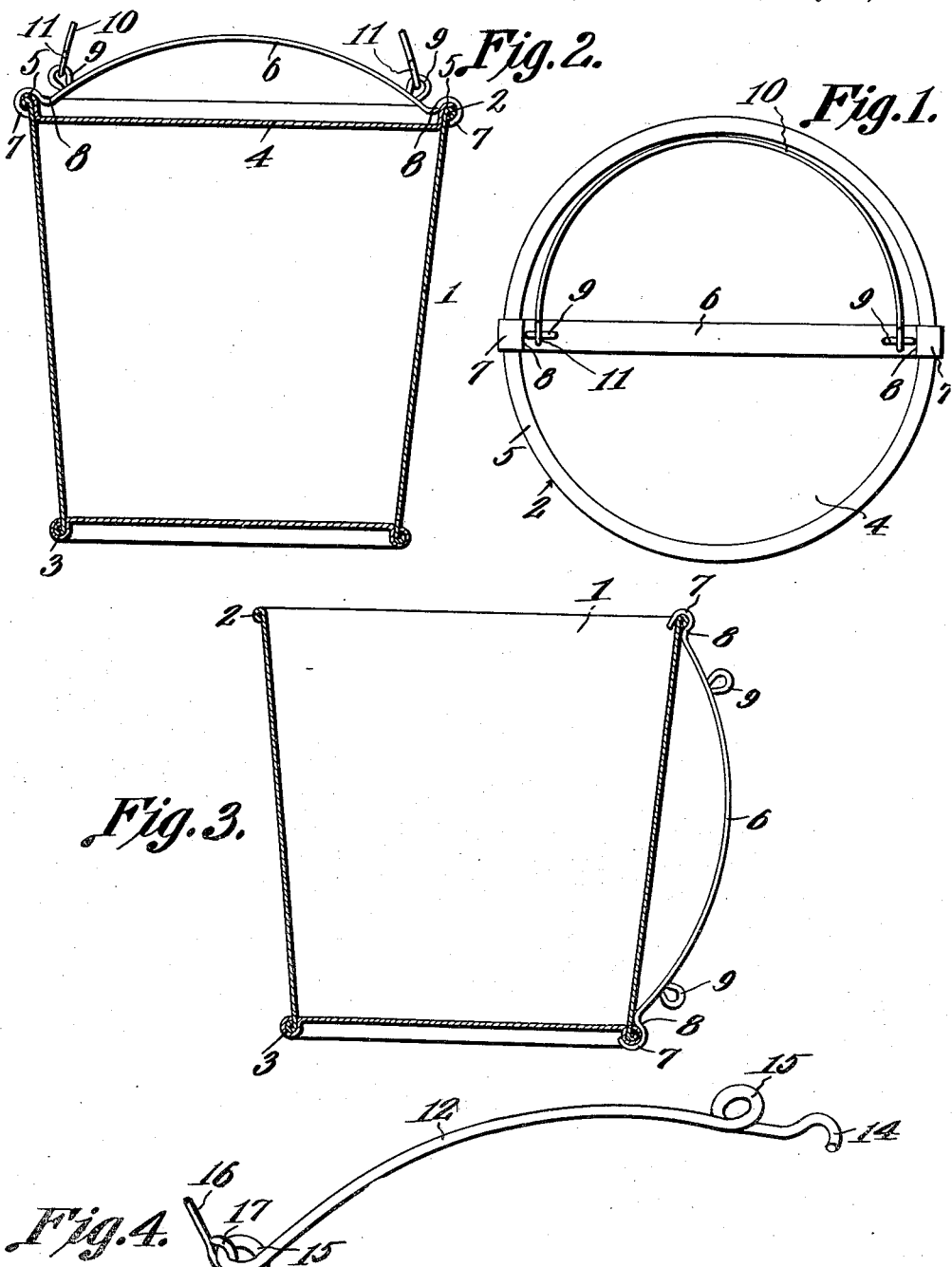

WILLIAM HENRY LAU, OF DETROIT, MICHIGAN.

LARD-PAIL.

1,183,990.  Specification of Letters Patent.  Patented May 23, 1916.

Application filed February 19, 1915. Serial No. 9,339.

*To all whom it may concern:*

Be it known that I, WILLIAM HENRY LAU, a citizen of the United States, residing at Detroit, in the county of Wayne and State of Michigan, have invented a new and useful Lard-Pail, of which the following is a specification.

The device forming the subject matter of this application is a receptacle adapted to contain lard, paint or any other substance.

One object of the present invention is to provide a novel form of handle adapted to hold the cover on the receptacle and to constitute a means whereby the receptacle may be carried about.

Another object of the invention is to provide a handle of the type described which, when depressed, will automatically disengage itself from the upper edge of the receptacle.

Another object of the invention is to provide a receptacle having a removable handle which, at the will of the operator, may be assembled with the upper edge of the receptacle, to extend transversely thereacross, or be assembled longitudinally with the receptacle and extend between the upper and lower edges of the receptacle thereby to convert the receptacle into a dipper.

Another object of the invention is to improve generally and to enhance the utility of devices of that type to which the present invention appertains.

With the above and other objects in view which will appear as the description proceeds the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows the invention in top plan; Fig. 2 is a longitudinal section, parts being broken away; Fig. 3 is a longitudinal section, the cover of the receptacle being removed and the handle being assembled with the receptacle longitudinally of the receptacle; Fig. 4 is a perspective showing a slightly modified form of handle.

In the accompanying drawings the numeral 1 indicates a receptacle which may be made out of any desired material. The receptacle 1 adjacent its upper end is provided with a circumscribing bead 2 and adjacent its lower end the receptacle 1 is equipped with a circumscribing bead 3.

A cover 4 for the receptacle 1 is provided, the same having a peripheral lip 5 which rests on top of the bead 2 as clearly shown in Fig. 2.

In carrying out the invention there is provided, in combination with the elements above cited, a handle 6 which may be made out of a flat strip of resilient material, the handle terminating in hooks 7 which engage the lip 5 of the cover 4 and extend beneath the bead 2. Adjacent the hooks 7, the handle 6 is equipped with inclined shoulders 8. Eyes 9 may be mounted upon the handle 6 and be secured thereto in any desired manner, the eyes 9 being adapted to receive, removably, hooks 11 formed at the ends of a bail 10, the bail 10 thus being pivotally assembled with the handle 6.

In practical operation, when the parts are disposed as shown in Fig. 2 it will be obvious that the cover 4 will be held securely on the receptacle 1. Further, since the hooks 7 engage beneath the bead 2, the handle constitutes a means whereby the receptacle may be carried about. Between the hooks 7 the handle 6 is arched upwardly and away from the cover 4. The handle 6 is resilient, and when the handle is depressed, the inclined shoulders 8 will ride on the lip 5 and effect a disengagement of the hooks 7 from the bead 2. The handle 6 may be connected with the upper end of the receptacle 1, even though the cover 4 has been removed. The shoulders 8 then bear against the inner edge of the bead 2, and when the handle 6 is pushed downwardly, the shoulders 8 will coact with the bead and disengage the hooks 7 therefrom.

The height of the receptacle 1 is substantially equal to the diameter of the receptacle measured across its mouth. Consequently, if desired, one of the hooks 7 may be connected with the bead 2, the other of the hooks 7 being connected with the bead 3. Under the circumstances above pointed out, the handle 6 extends longitudinally of the receptacle 1, as clearly shown in Fig. 3, and the receptacle may then be employed as a dipper. If desired, the handle may be fashioned as shown in Fig. 4. The handle in Fig. 4, designated by the numeral 12, is constructed from a single piece of resilient material, preferably wire, the ends of the strip being bent into hooks 14 and the strip being twisted upon itself, intermediate its ends, to form eyes 15 coacting with hooks 17 formed upon the bail 16.

Although the pail or receptacle herein disclosed preferably is manufactured from metal, it is obvious that paper, properly treated, so as to be grease-proof may be employed if considered desirable or necessary.

Having thus described the invention, what is claimed is:—

In a device of the class described, a receptacle the height of which substantially equals its diameter at the top, the top and the bottom of the receptacle being provided respectively with upper and lower beads; a handle adapted to be disposed longitudinally of the receptacle and to be disposed across the top of the receptacle, the handle having terminal hooks adapted to engage opposed portions of the upper bead when the handle is disposed across the top of the receptacle, and adapted to engage the upper and lower beads when the handle is disposed longitudinally of the receptacle, the handle having inclined shoulders coacting with the inner edges of the upper bead when the handle is disposed across the top of the receptacle, and coacting with the inner edges of the upper and lower beads when the handle is disposed longitudinally of the receptacle, the handle being continuously arched away from the receptacle, whereby the handle may be elongated when the handle is pushed inwardly, thus to cause the shoulders to coact with the inner edges of the upper bead and to coact with the inner edges of the upper and lower beads, thus to disengage the hooks from the upper bead and to disengage the hooks from the upper and lower beads.

In testimony that I claim the foregoing as my own, I have hereto affixed my signature in the presence of two witnesses.

WILLIAM HENRY LAU.

Witnesses:
W. M. HAWLEY,
E. M. WOOD.